United States Patent
Yu et al.

(10) Patent No.: US 8,947,736 B2
(45) Date of Patent: *Feb. 3, 2015

(54) METHOD FOR BINARIZING SCANNED DOCUMENT IMAGES CONTAINING GRAY OR LIGHT COLORED TEXT PRINTED WITH HALFTONE PATTERN

(75) Inventors: Songyang Yu, Foster City, CA (US); Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 12/946,801

(22) Filed: Nov. 15, 2010

(65) Prior Publication Data
US 2012/0120453 A1    May 17, 2012

(51) Int. Cl.
*G06K 15/02*  (2006.01)
*H04N 1/405*  (2006.01)
*H04N 1/407*  (2006.01)
*H04N 1/409*  (2006.01)
*H04N 1/00*   (2006.01)
*H04N 1/04*   (2006.01)
(Continued)

(52) U.S. Cl.
CPC ............ *H04N 1/40062* (2013.01); *H04N 1/405* (2013.01)
USPC ......... 358/3.06; 358/2.1; 358/2.99; 358/3.01; 358/3.11; 358/3.23; 358/3.26; 358/1.11; 358/401; 358/474; 358/505; 382/173; 382/176; 382/180

(58) Field of Classification Search
CPC .......................... H04N 1/405; H04N 1/40062
See application file for complete search history.

(56) References Cited

U.S. PATENT DOCUMENTS

| 3,905,018 A | * | 9/1975  | Gray ............................ 382/308 |
| 4,701,807 A | * | 10/1987 | Ogino ........................... 358/2.1 |
| 5,131,049 A |   | 7/1992  | Bloomberg et al. |

(Continued)

FOREIGN PATENT DOCUMENTS

| JP | H06-231306  | 8/1994 |
| JP | 2005-326971 | 11/2005 |

OTHER PUBLICATIONS

Fisher et al, "A Rule-Based System for Document Image Segmentation", Jun. 1990, Pattern Recognition Proceedings, 10th International Conference on, vol. i, pp. 567-572.*

(Continued)

*Primary Examiner* — King Poon
*Assistant Examiner* — Beniyam Menberu
(74) *Attorney, Agent, or Firm* — Chen Yoshimura LLP (57) ABSTRACT

A method for binarizing a scanned document images containing gray or light colored text printed with halftone patterns. The document image is initially binarized and connected image components are extracted from the initial binary image as text characters. Each text character is classified as either a halftone text character or a non-halftone text character based on an analysis of its topology features. The topology features may be the Euler number of the text character; a text character with a Euler number below −2 is classified as halftone text. The gray-scale document image is then divided into halftone text regions containing only halftone text characters and non-halftone text regions. Each region is binarized using its own pixel value statistics. This eliminates the influence of black text on the threshold values for binarizing halftone text. The binary maps of the regions are combined to generate the final binary map.

21 Claims, 5 Drawing Sheets

(51) Int. Cl.
*G06K 9/34* (2006.01)
*H04N 1/40* (2006.01)

(56) References Cited

U.S. PATENT DOCUMENTS

| | | | | |
|---|---|---|---|---|
| 5,355,437 A | * | 10/1994 | Takatori et al. | 706/31 |
| 5,452,107 A | | 9/1995 | Koike | |
| 5,835,638 A | * | 11/1998 | Rucklidge et al. | 382/257 |
| 5,974,195 A | * | 10/1999 | Kawazome et al. | 382/266 |
| 6,266,154 B1 | | 7/2001 | Allen | |
| 6,687,401 B2 | * | 2/2004 | Naoi et al. | 382/190 |
| 6,750,984 B1 | * | 6/2004 | Kanata et al. | 358/2.1 |
| 6,804,395 B1 | * | 10/2004 | Yoshida | 382/176 |
| 2003/0113016 A1 | * | 6/2003 | Naoi et al. | 382/181 |
| 2004/0114185 A1 | | 6/2004 | Shiau et al. | |
| 2004/0264781 A1 | * | 12/2004 | Eschbach et al. | 382/226 |
| 2006/0002617 A1 | * | 1/2006 | Dolan et al. | 382/254 |
| 2006/0165285 A1 | * | 7/2006 | Adachi | 382/173 |
| 2006/0291732 A1 | * | 12/2006 | Bai et al. | 382/239 |
| 2007/0047805 A1 | * | 3/2007 | Ohtsu | 382/164 |
| 2008/0226171 A1 | * | 9/2008 | Yin et al. | 382/174 |
| 2009/0067709 A1 | * | 3/2009 | Gross et al. | 382/166 |
| 2012/0093412 A1 | | 4/2012 | Dauw et al. | |

OTHER PUBLICATIONS

N. Otsu, "A Threshold Selection Method from Gray-Level Histograms," IEEE Transactions on Systems, Man, and Cybernetics, vol. 9, No. 1, 1979, pp. 62-66.

A. Rosenfield, R. C. Smith, "Thresholding using Relaxation", IEEE Transactions on Pattern Analysis and Machine Intelligence, vol. 3, No. 5, 1981, pp. 598-606.

V.A. Shapiro, P. K. Veleva, V.S. Sgurev, "An Adaptive Method for Image Thresholding", Proceedings of the 11th IAPR Interational Conference on Pattern Recognition, 1992, pp. 696-699.

W. Niblack, "An introduction to Image Processing", Prentice-Hall, Englewood Cliffs, 1986, pp. 115-116.

J. Sauvola, M. Pietikainen, "Adaptive document image binarization", Pattern Recognition, vol. 33, 2000, pp. 225-236.

I. Kim, D. Jung, R. Park, Document image binarization based on topographic analysis using a water flow model, Pattern Recognition vol. 35, 2002, pp. 265-277.

William K. Pratt, "Digital Image Processing "Fourth Edition, John Wiley & Sons, Inc., 2007, pp. 624.

Japanese Office Action, dated May 20, 2014, in a counterpart Japanese patent application, No. JP 2011-206636.

* cited by examiner

METHOD FOR BINARIZING SCANNED DOCUMENT IMAGES CONTAINING GRAY OR LIGHT COLORED TEXT PRINTED WITH HALFTONE PATTERN

BACKGROUND OF THE INVENTION

1. Field of the Invention

This invention relates to method and apparatus for binarizing scanned document images, and in particular, it relates to a method and apparatus for binarizing scanned document images that contain gray or light colored text printed with halftone patterns.

2. Description of Related Art

With the development of computer technology and the Internet, electronic documents are becoming more and more popular because of its advantages over paper based documents, such as easy storage, easy search and retrieve, fast transmission, and environmental friendliness. In the past, paper based documents have dominated for a long time and a large amount of paper based documents have been generated over the years. A paper based document can be converted to an electronic document using a scanner. For documents that contain text, it is further desirable to convert the scanned document images into text for text searching and other purposes.

Automatic document analysis systems have been developed to convert scanned document images into searchable electronic documents. Such a system typically includes three major components, namely a binarization component, a segmentation component, and an optical character recognition (OCR) component. The first component, binarization, separates the foreground (text, picture, line drawing, etc.) from the background. It converts a color or gray-scale image into a binary image where each pixel has a value of zero or one. Binarization is an important step because the subsequent segmentation and recognition components rely on high quality binarized images. Good binarization results not only can decrease the computational load and simplify the subsequent analysis, but also can improve the overall performance of the automatic document analysis system.

In conventional methods, binarization is typically performed either globally or locally. Global binarization methods use one calculated threshold value for the entire scanned image to convert multi-bit pixel values into binary pixel values. Pixel values above the threshold value are converted to 1 (or 0) and pixel values below the threshold value are converted to 0 (or 1). Local binarization methods use adapted statistical values calculated from local areas as threshold values for binarization of the local areas.

Examples of global binarization methods can be found in N. Otsu, "A Threshold Selection Method from Gray-Level Histograms," IEEE Transactions on Systems, Man, and Cybernetics, Vol. 9, No. 1, 1979, pp. 62-66 (hereinafter "Otsu"); A. Rosenfield, R. C. Smith, "Thresholding using Relaxation", IEEE Transactions on Pattern Analysis and Machine Intelligence, Vol. 3, No. 5, 1981, pp. 598-606; and V. A. Shapiro, P. K. Veleva, V. S. Sgurev, "An Adaptive Method for Image Thresholding", Proceedings of the 11th IAPR International Conference on Pattern Recognition, 1992, pp. 696-699. Examples of local binarization methods can be found in W. Niblack, "An introduction to Image Processing", Prentice-Hall, Englewood Cliffs, 1986, pp. 115-116; J. Sauvola, M. Pietikainen, "Adaptive document image binarization", Pattern Recognition, Vol. 33, 2000, pp. 225-236 (hereinafter "Sauvola et al."); and I. Kim, D. Jung, R. Park, Document image binarization based on topographic analysis using a water flow model, Pattern Recognition Vol. 35, 2002, pp. 265-277.

SUMMARY

Accordingly, the present invention is directed to a binarization method that substantially obviates one or more of the problems due to limitations and disadvantages of the related art.

An object of the present invention is to produce high quality binary image from a scanned gray-scale image that contains both halftone text and non-halftone text.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for binarizing a gray-scale document image which has been generated by scanning a paper-based document, the method including: (a) identifying text characters in the gray-scale document image; (b) classifying each text character identified in step (a) as either a halftone text character or a non-halftone text character based on a topological analysis of the text character; and (c) binarizing halftone text characters using pixel value characteristics obtained from only halftone text characters classified in step (b).

The method may further include: (d) after step (b) and before step (c), dividing the gray-scale document image into halftone text regions containing only halftone text characters and non-halftone text regions containing non-halftone text characters, wherein step (c) comprises binarizing each halftone text region using pixel value statistics calculated from pixels in that region only, to generate a binary map for each halftone text region.

The method may further include: (e) after step (d), binarizing each non-halftone text region using pixel value statistics calculated from pixels in that region only, to generate a binary map for each non-halftone text region; and (f) combining the binary maps for the halftone text regions and the binary maps for the non-halftone text region generated in steps (c) and (e) to generate a binary map of the gray-scale document image.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another aspect, the present invention provides a scanner including: a scanning section for scanning a hard copy document to generate a gray-scale document image; and a data processing apparatus for processing the gray-scale document image to generate a binary map of the gray-scale document image, wherein the processing includes the above method steps.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide an improved method for binarizing document images obtained by scanning a paper based document. In this disclosure, the terms "paper based document", "printed document" and "hard copy document" are used interchangeably. These documents need not be printed on paper only; they may be printed on other physical media such as transparency, etc.

With the desire for high quality text and pictures, printed documents are typically scanned at a high resolution, for example, often at 600 dpi (dots per inch) or higher. In a printed document, gray or light color text or image is often printed using a halftone method. For example, a printed gray area will contain a plurality of black dots of ink or toner, the sizes and/or density of the dots being dependent on the gray-scale value of the gray area. Similarly, light colored areas are printed by printing color saturated dots. In this disclosure, text printed by a halftone method is referred to as halftone text.

When a printed document containing halftone text is scanned at a high resolution, in particular, when the pixel size of the scan is substantially smaller than the halftone dots, the halftone dots are typically visible in the scanned image. FIG. 1(b) is an enlarged view illustrating a scanned image of text when the corresponding text in the paper document was printed as a halftone gray color. In this illustration, the halftone dots are clearly visible. Further, the scanned pixels in the halftone text have various gray pixel values. Pixels located within a halftone dot tend to have darker gray pixel values, and pixels located in areas between adjacent halftone dots tend to have lighter gray or white pixel values. The varying gray pixel values arise from the limited sensitivity or accuracy of the scanner used to scan the document.

Figure 1A:
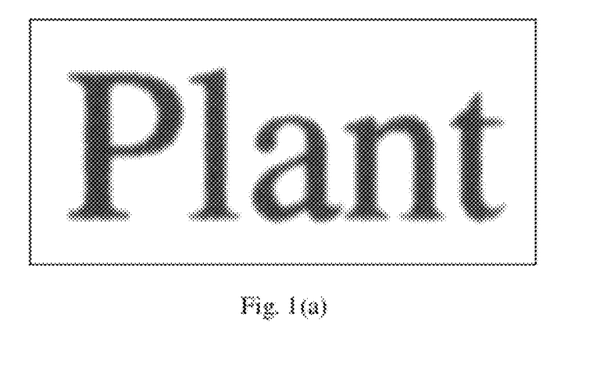
FIG. 1(a) is an enlarged view illustrating a scanned image of text when the corresponding text in the paper document was printed as black text.
Figure 1B:
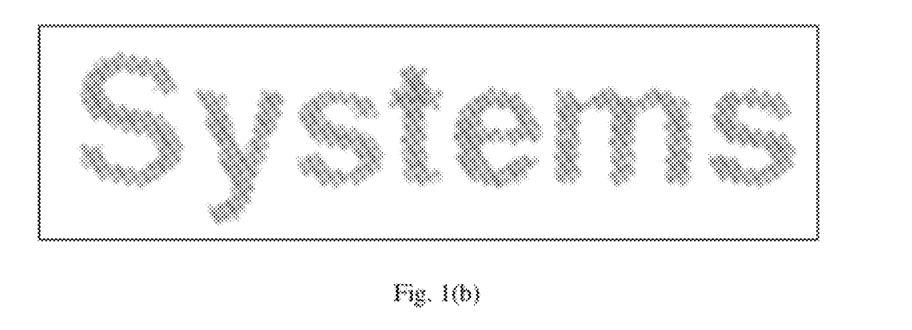
FIG. 1(b) is an enlarged view illustrating a scanned image of text when the corresponding text in the paper document was printed as a halftone gray color.

As a comparison, FIG. 1(a) is an enlarged view illustrating a scanned image of text when the corresponding text in the paper document was printed as black text. There are no visible halftone dots. Further, the pixel values within the text area are a black value or close to a black value.

Figure 1C:
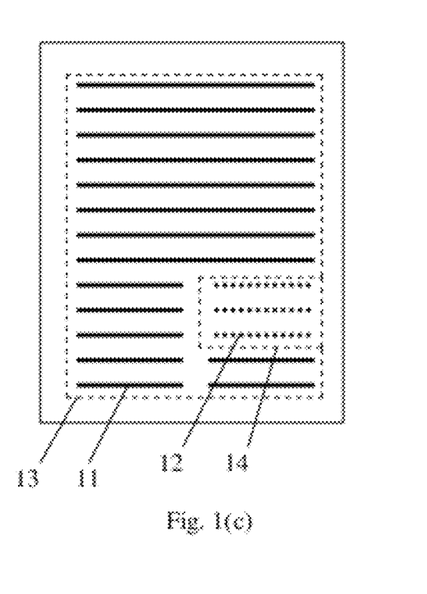
FIG. 1(c) schematically illustrates an image of a page of document containing both dark (black) text and light (gray) text.

Black text and gray text often co-exist in the same page of document. FIG. 1(c) schematically illustrates an image of a page of document containing both black text (schematically represented by thick solid lines 11) and gray text.

In this disclosure, when referring to pixel values, a "black value" refers to a numerical value representing a black pixel and a "white value" refers to a numerical value representing a white pixel. In many systems, a white pixel has a pixel value 255 and a black pixel has a pixel value 0. A "gray value" is value between a black value and a white value.

Although black and gray text is used in these illustrations, the same effects exist in color images, where the text may be printed as color saturated text (similar to black text) or light colored text (similar to light gray text, using a halftone method). The descriptions below use black as an example, but the method described herein is applicable to colored text as well.

When a printed document contains both black text and halftone text, conventional binarization methods often lead to unsatisfactory results for the halftone text. As mentioned earlier, conventional binarization methods typically perform binarization either globally or locally. Neither conventional global binarization methods nor conventional local binarization methods produce satisfactory results on scanned images with halftone text. Typically, halftone text makes up only a small portion of an entire document image. As explained earlier, due to the presence of the halftone pattern, pixel values of halftone text tend to be a gray value while pixel values of non-halftone text tend to be much closer to a black value. As a result, when a global threshold method is used, such as Otsu threshold described in the Otsu reference, the calculated global threshold value tends to be very close to the black pixel value of the dark text. When binarization is carried out using such a threshold value, the halftone text is often completely or partially absent in the binarization result because their pixel values do not satisfy the threshold value. Even when a local threshold method is used, some of the halftone text may still be absent if a major portion of text in the local window is dark text. The situation becomes worse when halftone text is at lighter gray level (i.e. close to the background value). Poor binarization results for halftone text have severe adverse effects on the subsequent components of the automatic document analysis system, in particular the OCR component.

Figure 2A:
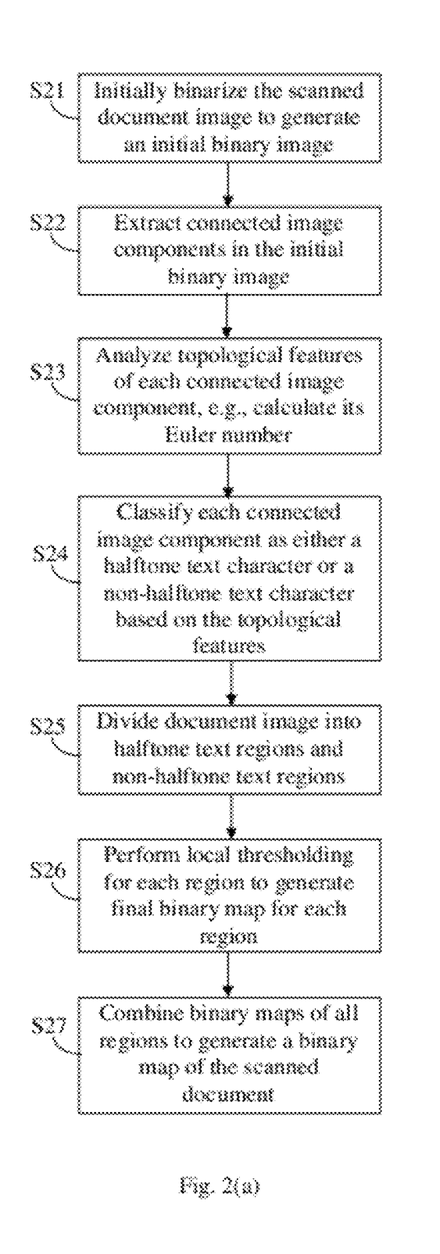
FIGS. 2(a) and 2(b) schematically illustrate a method for binarizing scanned document images containing gray or light colored text printed with halftone pattern according to a first embodiment of the present invention.

FIG. 2(a) schematically illustrates a method for binarizing scanned document images containing gray or light colored text printed with halftone pattern according to an embodiment of the present invention. This method separates halftone text from non-halftone text based on an analysis of the topological features of the text characters, and then binarizes halftone text and non-halftone text separately using their respective threshold values.

First, the scanned document image is initially binarized (step S21). This step may use any suitable local or global textual binarization method, including conventional methods. Typically, local binarization involves dividing the image into multiple small non-overlapping blocks, calculating a threshold value for each block, and binarizing the block using the threshold value. In one embodiment, a method described in Sauvola et al. is used to perform the initial binarization. An initial binary image is generated by step S21.

Connected image components in the initial binary image are then extracted (step S22). In a binary image, a connected image component is a connected group of pixels of the same pixel value (e.g. black). Methods for extracting connected image components are generally known; any suitable algorithm may be employed in this step. Each connected image component extracted in this step is potentially a text character. Steps S21 and S22 collectively can be referred to as a step of identifying text characters in the scanned document image.

Figure 4A:
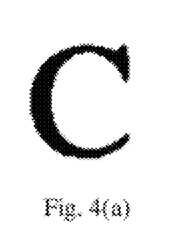
FIGS. 4(a)-4(d) are images of text characters in a scanned document showing the Euler numbers for non-halftone and halftone text characters.
Figure 4B:
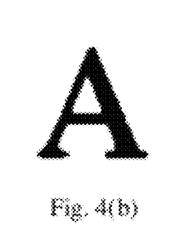
Figure 4C:
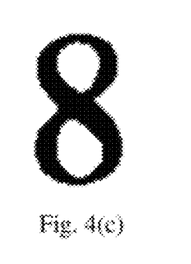
Figure 4D:
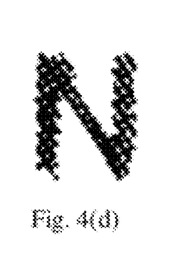

Then, each connected image component (text character) is classified as either a halftone text character or a non-halftone text character based on an analysis of its topology features (steps S23 and S24). Because of the halftone process, connected image components for halftone text contain many more holes than connected image components for non-halftone text. A hole is an area of white pixels enclosed by black pixels of a connected image component. In a preferred embodiment, this feature is used to classify each connected image component (character). In a particular embodiment, the Euler number is used as a criterion for classifying halftone text characters and non-halftone text characters. The Euler number (an integer) is a measure of the topology of an image. It is defined as $$E = C - H,$$

where E is the Euler number, C is the number of connected image components in the image and H is the number of holes. The Euler number for a text character (e.g. English letters and Arabic numerals) is typically 1, 0 or −1. For example, as shown in FIGS. 4(a)-4(c), the character "C" has an Euler number of 1, because it has one connected image component and no holes; the character "A" has an Euler number of 0, because it has one connected image component and one hole; and the numeral "8" has an Euler number of −1, because it has one connected image component and two holes. Because halftone text typically contains many holes, the Euler number for a halftone text character (including numerals) is generally much smaller than −1. For example, the halftone letter "N" in FIG. 4(d) has an Euler number of −43. As such, the Euler number is a good measure for halftone text detection.

In step S23, the Euler number for each detected text character (i.e. connected image component) is calculated. Any suitable algorithm may be used to calculate the Euler number. In step S24, each connected image component is classified as either a halftone text character or a non-halftone text character based on its Euler number. In one implementation, a connected image component is classified as halftone text character if it has an Euler number below a predefined value, such as −2. Otherwise, it is classified as a non-halftone text character.

More generally, step S23 is a step of analyzing topological features of the text characters, and step S24 is a step of classifying text characters based on the topological features. Collectively, steps S23 and S24 constitute a step of classifying text characters as either halftone text characters or non-halftone text characters based on topological analyses.

Figure 2B:
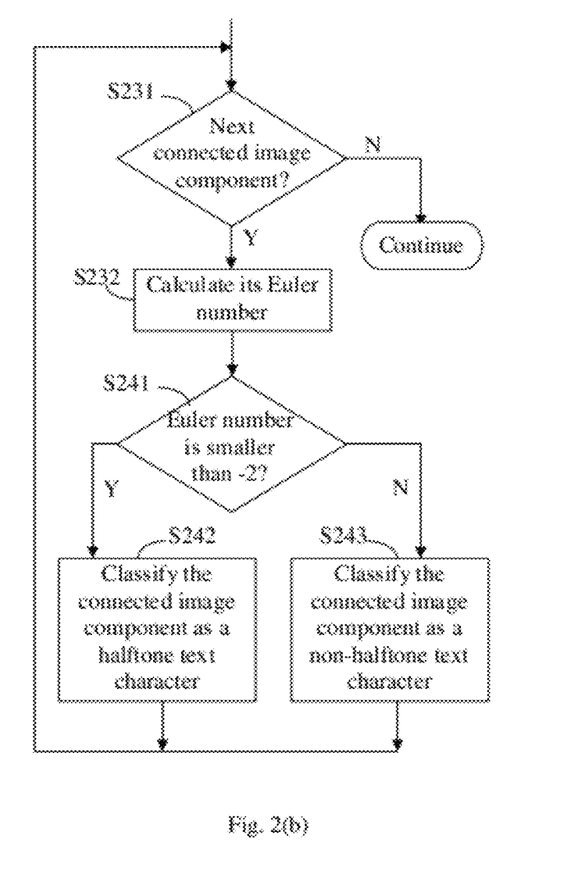

More specifically, steps S23 and S24 may be implemented by a decision loop as shown in FIG. 2(b). The connected image components (i.e. text character) are processed one at a time. For the next connected image component ("Y" in step S231), its Euler number is calculated (step S232). Then, it is determined whether the Euler number is smaller than −2 (step S241). If it is ("Y" in step S241), the text character is classified as a halftone text character (step S242). If it is not ("N" in step S241), the text character is classified as a non-halftone text character (step S243). The process then determines whether there is a next connected image component to be processed (step S231). If yes ("Y" in step S231), steps S232, A241, S242 and S243 are repeated. If there are no more connected image components to be processed ("N" in step S231), the process continues to the next step (i.e. to step S25).

It should be noted that FIG. 2(b) is only an exemplary implementation. In an alternative implementation (not shown in the figures), the step of extracting connected image components (step S22) can be placed inside the loop, i.e., after one connected image component is extracted, its Euler number is calculated and it is classified as a halftone or non-halftone text character, and then the next connected image component is extracted and the process repeats. One skilled in the art will recognize that other suitable implementations exist.

After the detected text characters in the document image are classified into halftone and non-halftone text, the document image is divided into halftone text regions containing only halftone text characters and non-halftone text regions containing non-halftone text characters (step S25). The non-halftone text regions may also contain other document elements such as graphics, pictures, etc., if they are present in the scanned document image. There may be a single or multiple halftone text regions and a single or multiple non-halftone text regions. In FIG. 1(c), the different text regions are schematically indicated by thin dotted lines, which define a non-halftone text region 13 and a halftone text region 14.

In a preferred embodiment, the division step S25 is accomplished by applying binary morphological operations to the non-halftone text and/or halftone text. Morphology is a broad set of image processing operations that process images based on shapes. Morphological operations apply a structuring element to an input image, creating an output image of the same size. In a morphological operation, the value of each pixel in the output image is based on a comparison of the corresponding pixel in the input image with its neighbors. By choosing the size and shape of the neighborhood (structure element), one can construct a morphological operation that is sensitive to specific shapes in the input image. The most basic morphological operations are dilation and erosion. In a preferred implementation, binary morphological operations are applied to the halftone text to generate the halftone text regions, and the same binary morphological operations are applied to the non-half tone text to generate the non-halftone text regions. Alternatively, binary morphological operations are applied to the halftone text to generate the halftone text regions, and the remaining regions of the image are considered non-halftone text regions. In a preferred embodiment, the structure element parameters used in the dilation operations are estimated from the width and height of the halftone text characters and non-halftone text characters respectively. They may be chosen as a predefined number of times of the average width and average height of the text characters.

Then, for each halftone text region and each non-halftone text region, a local thresholding or global thresholding method is performed on the original scanned document image to binarize the image to generate a final binarization result (binary map) for the region (step S26). In other words, each region is binarized using pixel value characteristics obtained from pixels in that region only. In particular, in each halftone text region, pixel value characteristics of the halftone text in that region only are used to calculate the threshold value for binarizing the halftone text.

In a preferred implementation, a conventional method described in the Otsu reference is used to perform thresholding for each halftone text region. Because the image has been divided into halftone text regions and non-halftone text regions, even a conventional thresholding method applied to a halftone text region will produce satisfactory binarization result for the halftone text. This is because a halftone text region contains only halftone text and a threshold values calculated by conventional thresholding method will not be influenced by non-halftone text. In a preferred implementation, each non-halftone text region is binarized using a conventional thresholding method described in the Otsu reference. Of course, other thresholding methods may be used to binarize the halftone text regions and the non-halftone text regions.

After the regions are binarized, the binary maps of the multiple regions are combined to generate a binary map of the entire scanned document image (step S27).

Figure 3:
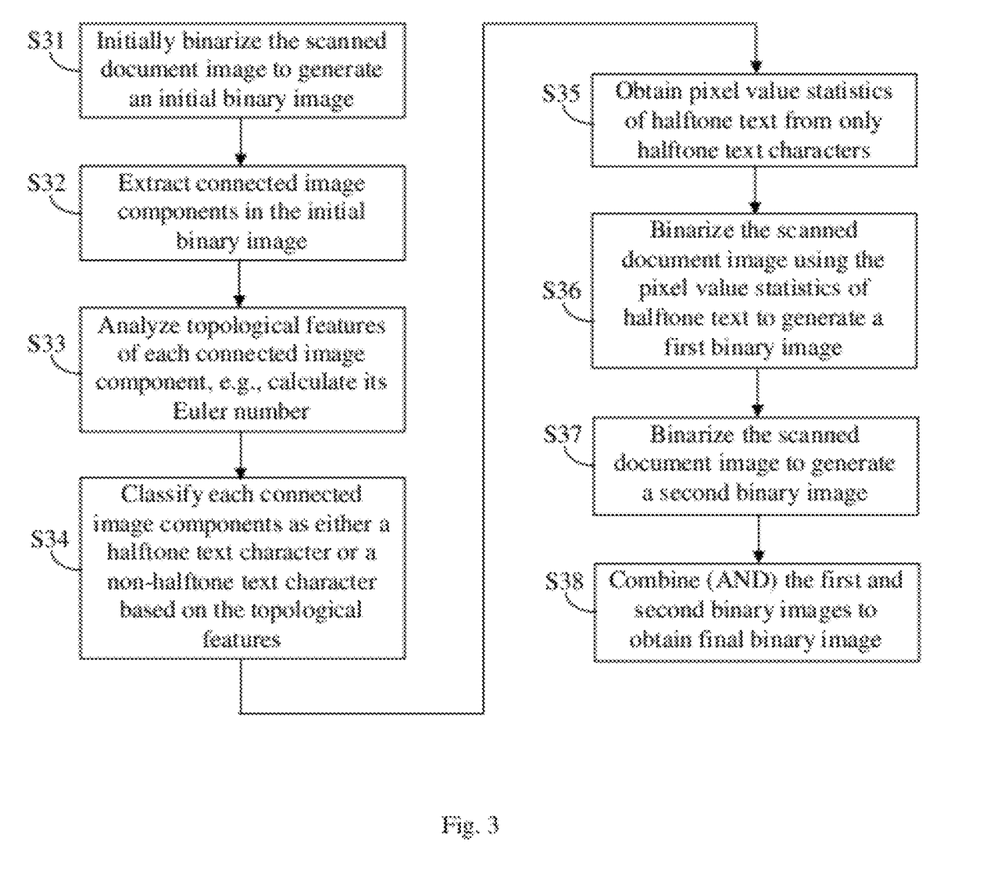
FIG. 3 schematically illustrates a method for binarizing scanned document images containing gray or light colored text printed with halftone pattern according to a second embodiment of the present invention.

FIG. 3 schematically illustrates a method for binarizing scanned document images containing gray or light colored text printed with halftone pattern according to a second embodiment of the present invention. In the second embodiment, steps S31 to S34 are identical to steps S21 to S24 in the first embodiment shown in FIGS. 2(a) and 2(b).

After most of the halftone text characters are identified by the classification step S34, the pixel value statistics of the halftone text, such as the mean pixel value, minimum pixel value and maximum pixel value, are estimated (step S35). It should be noted that for this purpose, it is not necessary to have all the characters of halftone text identified; missing a few halftone characters will not cause a significant change in the estimated pixel value statistics. Then, the scanned document image is binarized using the pixel value statistics of the halftone text to generate a first binary image (step S36). In a preferred embodiment, pixels having pixel values falling between the minimum and maximum pixel values are assigned one binary value (e.g. black), and pixels having pixel values falling outside of that range are assigned the other binary value (e.g. white). The resulting first binary image contains binarized images of the halftone text of the original scanned document. The first binary image also contain other images corresponding to certain gray pixels in the original scanned document that are not halftone text, notably pixels at edges of black text characters.

Then, the scanned document image is binarized again to generate a second binary image (step S37). Any suitable binarization method, such as conventional local or global binarization methods, may be used in this step. Preferably, before this binarization step, the original scanned document image is modified to set the pixel values of the halftone text character obtained in S36 to the background value (e.g. white). As a result, the halftone text character found in S36 will not appear in the second binary image. The reason for this is to minimize the influence of the halftone text on the calculation of the threshold for non-halftone text in step S37. Then, the first and second binary images are combined (by a bitwise AND operation) to generate a final binary image. Because the first binary image contains the binarized halftone text and the second binary image contains binarized non-halftone text, the final binary image can be a satisfactory binarization result for both halftone and non-halftone text.

It can be seen that in both binarization methods described above (first and second embodiments), text characters are classified into halftone text characters and non-halftone text characters, and then halftone text is binarized using pixel value characteristics obtained from the halftone text only. Compared with conventional methods such as global histogram based thresholding methods, the binarization methods according to embodiments of the present invention produce better binarization result on scanned document images containing both halftone text and non-halftone text.

Figure 5A:
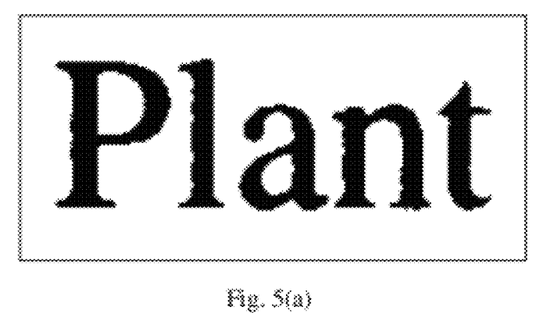
FIGS. 5(a) and 5(b) show portions of binarization results using a method according to the first embodiment of the present invention.
Figure 5B:
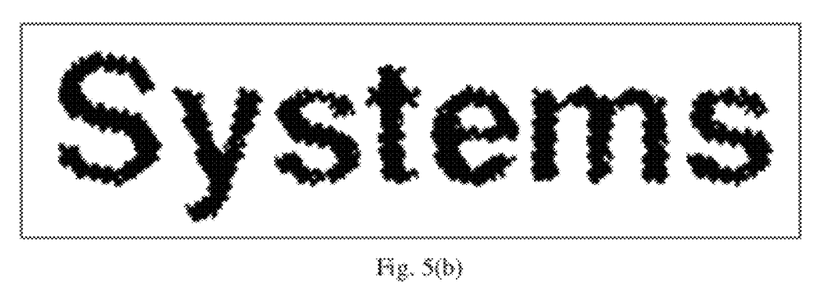

The inventors tested a particular implementation of the first embodiment on document images contains both halftone text and non halftone text. Portions of the binarization result corresponding to the sample images in FIGS. 1(a) and 1(b) are shown in FIGS. 5(a) and 5(b).

For the initial binarization (step S21), a conventional method described in Sauvola et al. was used in the test. Specifically, the scanned document image is divided into blocks of 64×64 pixels, and the threshold value for each block is calculated by the following formula:

$$T=m*(1+k*(s/R-1));$$

where T is the calculated threshold value for the block, m is the mean pixel value of the block, S is the standard deviation of the pixel value of the block, constant k is 0.2, and constant R is 128. The Euler number was used as the topological features in step S23, and connected image components with Euler numbers less than −2 were classified as halftone text in step S24.

In step S25, dilation operations were applied to the halftone text to generate the halftone text regions, and applied to the non-half tone text to generate the non-halftone text regions. For halftone text, the width and height of the structure element used the dilation operations were both four times the average width and average height of the halftone text. For non-halftone text, the width and height of the structure element were both two times the average width and average height of the non-halftone text.

In the final binarization step S26, the halftone text regions and the non-halftone regions were separately binarized using the Otsu method.

Figure 6A:
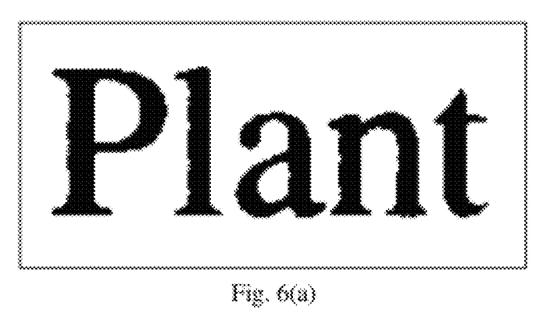
FIGS. 6(a) and 6(b) show portions of binarization results using a conventional global thresholding method.
Figure 6B:
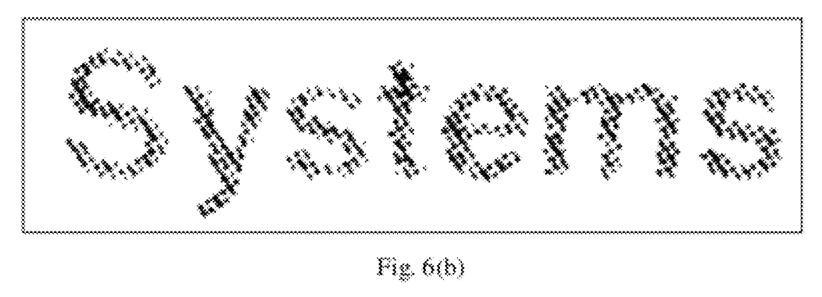

For comparison, the inventors applied the conventional Otsu's method to binarize the same test document. Portions of the binarization result corresponding to the sample images in FIGS. 1(a) and 1(b) are shown in FIGS. 6(a) and 6(b). Through visual comparison, it can be seen that while the binarization results for black text (FIGS. 5(a) and 6(a) are comparable using both techniques, for halftone text, the result using the method described above (FIG. 5(b)) is significantly better than the result using the conventional global threshold method (FIG. 6(b)). It can be seen that in FIG. 6(b), the connectivity of the text characters is not properly preserved and there are many holes in the binarized text characters. In FIG. 5(b), the connectivity of the text characters is preserved significantly better, and there are far fewer or no holes in the binarized text characters.

The inventors further inputted the two binarization results into the OCR Text Recognition function of Adobe™ Acrobat™ 9 Pro. When the binarization result of the global threshold method was fed to the OCR function, only less than 57% of the halftone text characters were correctly recognized. When the binarization result using the method described above was fed to the OCR function, 99% of the halftone text characters were correctly recognized. This demonstrates that a better binarization result can improve performance of the automatic document analysis system including the OCR component.

The inventors also tested an implementation of the second embodiment on document images contains both halftone text and non halftone text. The binarization results show that this implementation is superior to the conventional Otsu's method discussed above, but less satisfactory than the implementation of the first embodiment. Therefore, the inventors currently believe that the first embodiment is the best mode for carrying out the invention.

Figure 7:
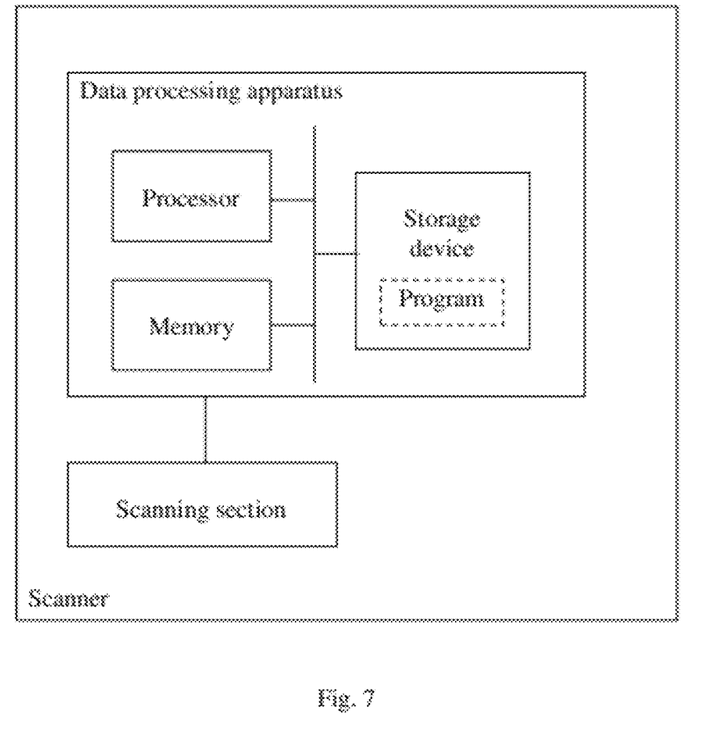
FIG. 7 schematically illustrates a scanner including a data processing apparatus in which binarization methods according to embodiments of the present invention may be implemented.

The methods described above can be implemented in a data processing apparatus which includes a processor, a memory (e.g. RAM) and a storage device (e.g. ROM) for storing programs, as shown in FIG. 7. The data processing apparatus may be a standalone computer, or it may be a part of a scanner (including a multi-function printer-scanner-copier device) which also includes a scanning section for scanning a hard copy document (see FIG. 7). The data processing apparatus carries out the method by the processor executing computer programs stored in the memory. The data processing apparatus takes a scanned gray-scale image as input and generates a binary image as output. In one aspect, the invention is a method carried out by a data processing apparatus. In another aspect, the invention is a computer program product embodied in computer usable non-transitory medium having a computer readable program code embedded therein for controlling a data processing apparatus. In another aspect, the invention is embodied in a data processing apparatus such as a computer or a scanner. In particular, the invention may be embodied in a scanner which includes a scanning section for scanning hard copy documents to generate the gray-scale scanned image, and a data processing apparatus for binarizing the scanned document image to generate a binary document image.

It will be apparent to those skilled in the art that various modification and variations can be made in the binarization method and apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for binarizing a gray-scale document image which has been generated by scanning a paper-based document, the method comprising:
   (a) identifying text characters in the gray-scale document image, including:
      performing an initial binarization of the gray-scale image to generate an initial binary image; and
      extracting connected image components in the initial binary image as text characters;
   (b) classifying each text character identified in step (a) as either a halftone text character which is a character formed by a halftone pattern or a non-halftone text character based on a topological analysis of the text character which determines a number of holes in a connected image component corresponding to the text character, including
      calculating an Euler number for each text character; and
      classifying a text character as halftone text if the Euler number for the text character is below a predetermined value, and classifying a text character as non-halftone text if the Euler number of the text character is equal to or above the predetermined value; and
   (c) binarizing halftone text characters using pixel value characteristics obtained from only halftone text characters classified in step (b).

2. The method of claim 1, further comprising:
   (d) after step (b) and before step (c), dividing the gray-scale document image into halftone text regions containing only halftone text characters and non-halftone text regions containing non-halftone text characters,
   wherein step (c) comprises binarizing each halftone text region using pixel value statistics calculated from pixels in that region only, to generate a binary map for each halftone text region.

3. The method of claim 2, further comprising:
   (e) after step (d), binarizing each non-halftone text region using pixel value statistics calculated from pixels in that region only, to generate a binary map for each non-halftone text region.

4. The method of claim 3, further comprising:
   (f) combining the binary maps for the halftone text regions and the binary maps for the non-halftone text region generated in steps (c) and (e) to generate a binary map of the gray-scale document image.

5. The method of claim 2, wherein step (d) comprises applying binary morphological operations to all non-halftone text characters or to all halftone text characters or to both.

6. The method of claim 2, wherein step (c) comprises applying a local thresholding method to each halftone text region.

7. The method of claim 3, wherein step (e) comprises applying a local thresholding method or a global thresholding method to each non-halftone text region.

8. The method of claim 1, wherein step (c) comprises:
   (c1) calculating pixel value statistics from at least some of the halftone text characters classified in step (b), the pixel value statistics including a mean pixel value, a minimum pixel value and a maximum pixel value; and
   (c2) binarizing the document image using the pixel value statistics calculated in step (c1) to generate a first binary image;
   wherein the method further comprises:
   binarizing the document image to generate a second binary image; and
   combining the first and second binary image using a bitwise AND operation.

9. A computer program product comprising a computer usable non-transitory medium having a computer readable program code embedded therein for controlling a data processing apparatus, the computer readable program code configured to cause the data processing apparatus to execute a process for binarizing a gray-scale document image which has been generated by scanning a paper-based document, the process comprising:
   (a) identifying text characters in the gray-scale document image, including:
      performing an initial binarization of the gray-scale image to generate an initial binary image; and
      extracting connected image components in the initial binary image as text characters;
   (b) classifying each text character identified in step (a) as either a halftone text character which is a character formed by a halftone pattern or a non-halftone text character based on a topological analysis of the text character which determines a number of holes in a connected image component corresponding to the text character, including:
      calculating an Euler number for each text character; and
      classifying a text character as halftone text if the Euler number for the text character is below a predetermined value, and classifying a text character as non-halftone text if the Euler number of the text character is equal to or above the predetermined value; and
   (c) binarizing halftone text characters using pixel value characteristics obtained from only halftone text characters classified in step (b).

10. The computer program product of claim 9, wherein the process further comprises:
   (d) after step (b) and before step (c), dividing the gray-scale document image into halftone text regions containing only halftone text characters and non-halftone text regions containing non-halftone text characters;

wherein step (c) comprises binarizing each halftone text region using pixel value statistics calculated from pixels in that region only, to generate a binary map for each halftone text region.

11. The computer program product of claim 10, wherein the process further comprises:
(e) after step (d), binarizing each non-halftone text region using pixel value statistics calculated from pixels in that region only, to generate a binary map for each non-halftone text region.

12. The computer program product of claim 11, wherein the process further comprises:
(f) combining the binary maps for the halftone text regions and the binary maps for the non-halftone text region generated in steps (c) and (e) to generate a binary map of the gray-scale document image.

13. The computer program product of claim 9, wherein step (d) comprises applying binary morphological operations to all non-halftone text characters or to all halftone text characters or to both.

14. The computer program product of claim 10, wherein step (c) comprises applying a local thresholding method to each halftone text region.

15. The computer program product of claim 11, wherein step (e) comprises applying a local thresholding method or a global thresholding method to each non-halftone text region.

16. The computer program product of claim 9, wherein step (c) comprises:
(c1) calculating pixel value statistics from at least some of the halftone text characters classified in step (b), the pixel value statistics including a mean pixel value, a minimum pixel value and a maximum pixel value; and
(c2) binarizing the document image using the pixel value statistics calculated in step (c1) to generate a first binary image;

wherein the process further comprises:
binarizing the document image to generate a second binary image; and
combining the first and second binary image using a bitwise AND operation.

17. A scanner comprising:
a scanning section for scanning a hard copy document to generate a gray-scale document image; and a data processing apparatus for processing the gray-scale document image to generate a binary map of the gray-scale document image,
wherein the processing of the gray-scale document image includes: (a) identifying text characters in the gray-scale document image, including performing an initial binarization of the gray-scale image to generate an initial binary image, and extracting connected image components in the initial binary image as text characters, (b) classifying each text character identified in step (a) as either a halftone text character which is a character formed by a halftone pattern or a non-halftone text character based on a topological analysis of the text character which determines a number of holes in a connected image component corresponding to the text character, including calculating an Euler number for each text character, and classifying a text character as halftone text if the Euler number for the text character is below a predetermined value, and classifying a text character as non-halftone text if the Euler number of the text character is equal to or above the predetermined value, and (c) binarizing halftone text characters using pixel value characteristics obtained from only halftone text characters classified in step (b).

18. The scanner of claim 17, wherein the processing further includes: (d) after step (b) and before step (c), dividing the gray-scale document image into halftone text regions containing only halftone text characters and non-halftone text regions containing non-halftone text characters, wherein step (c) comprises binarizing each halftone text region using pixel value statistics calculated from pixels in that region only, to generate a binary map for each halftone text region, (e) after step (d), binarizing each non-halftone text region using pixel value statistics calculated from pixels in that region only, to generate a binary map for each non-halftone text region, and (f) combining the binary maps for the halftone text regions and the binary maps for the non-halftone text region generated in steps (c) and (e) to generate the binary map.

19. The scanner of claim 17, wherein step (d) comprises applying binary morphological operations to all non-halftone text characters or to all halftone text characters or to both.

20. The scanner of claim 17, wherein step (c) comprises applying a local thresholding method to each halftone text region.

21. The scanner of claim 17, wherein step (e) comprises applying a local thresholding method or a global thresholding method to each non-halftone text region.

* * * * *